United States Patent [19]
Birks

[11] Patent Number: 6,032,338
[45] Date of Patent: Mar. 7, 2000

[54] APPARATUS FOR SWAGING A FERRULE ONTO A WIRE ROPE

[75] Inventor: Cedric Gwilliam Birks, Leeds, United Kingdom

[73] Assignee: CCL Systems Limited, Leeds, United Kingdom

[21] Appl. No.: 09/145,043

[22] Filed: Sep. 1, 1998

Related U.S. Application Data

[62] Division of application No. 08/619,655, Mar. 20, 1996, Pat. No. 5,816,094.

[30] Foreign Application Priority Data

Sep. 21, 1993 [GB] United Kingdom .................... 9319434
Sep. 16, 1994 [GB] United Kingdom .... PCT/GB94/02025

[51] Int. Cl.[7] .............................. A44B 21/00; F16G 11/00
[52] U.S. Cl. .................. 24/114.5; 24/115 A; 24/265 EE; 24/300
[58] Field of Search ................................... 24/114.5, 114, 24/115 A, 265 EE, 300, 304

[56] References Cited

U.S. PATENT DOCUMENTS 3,416,197 12/1968 Mark ...................................... 24/115 A
3,705,444 12/1972 Wernsing ............................... 24/114.5
3,957,237 5/1976 Campbell ............................... 24/114.5

*Primary Examiner*—Victor N. Sakran
*Attorney, Agent, or Firm*—Jenkins & Wilson, P.A.

[57] ABSTRACT

The invention relates to a swaging method and apparatus for swaging flemish eye splices. In particular, the invention concerns the production of swaged joints in which, by virtue of providing ferrules (5) and swage blocks (16, 17) of a particular construction, during a swaging operation displaced material of the ferrule (5) is channeled into the swage blocks, rather than out of them, and hence ovality of the swaged ferrule is avoided. In this manner, the swage blocks (16, 17) can be brought fully home in a single operation until top and bottom flats (10e, 10f) of the ferrule (5) are in contact with top and bottom flats of the swage blocks (16, 17).

4 Claims, 6 Drawing Sheets

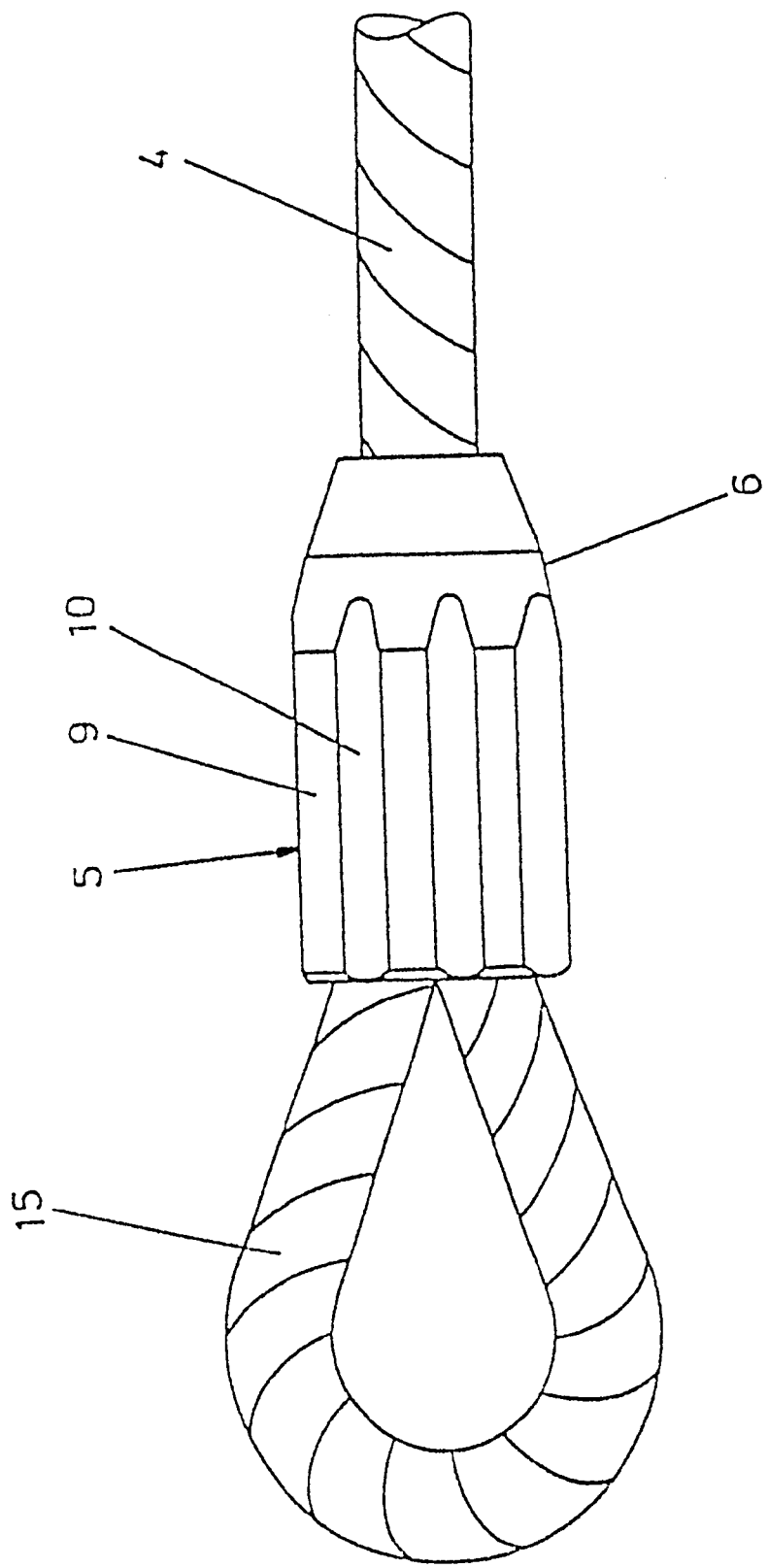

APPARATUS FOR SWAGING A FERRULE ONTO A WIRE ROPE

RELATED APPLICATIONS

This Application is a Divisional of Applicant's application Ser. No. 08/619,655 filed Mar. 20, 1996, and issued as U.S. Pat. No. 5,816,094 on Oct. 6, 1998.

The invention relates to a swaging method and apparatus and particularly, although not exclusively, to a method and apparatus of swaging a so-called flemish eye splice.

Flemish eye splicing is a well known means of forming a looped termination of ropes. In the "flemish eye" system, separated strands of the rope end are interwoven to form a loop. The hand splice formed thereby is a high performance joint which can usually withstand more than 40% of the ropes breaking load in tension. On wire ropes the hand splice is encapsulated by a steel tubular sleeve, or ferrule. The ferrule is compressed over a hand splice using a conventional press. The purpose of the ferrule is to achieve a further improvement in the performance of the splice, prevent unravelling of the splice and to prevent snagging of the hand splice as the wire rope is moved and handled.

A conventional swaging operation is illustrated in FIGS. 1A and 1B. In FIG. 1A a cylindrical ferrule 1 is shown positioned between two conventional swage blocks 2, 3. Strands of a wire rope 4 are shown as passing through the ferrule 1.

In order to compress the ferrule 1 onto the wire rope 4 the swaging blocks 2, 3 must have a cavity formed within them which is of a lesser diameter than that of the ferrule 1.

Referring now to FIG. 1B, it can be seen that as the swage block 3 is moved down towards the swage block 2, the ferrule 1 is pushed into an oval shape. To provide an effective encapsulation, it is necessary that the finished swaged joint is compressed evenly in all directions. In other words, the preferred finished shape of the compressed ferrule should be cylindrical. In order to achieve this, once the ferrule has been pressed oval, as in FIG. 1B, the ferrule and rope must be rotated by 90 degrees, so that the press is now bearing down directly across the area of ovality. However, this second pressing will cause the ferrule to go oval once again, with a requirement for further removal, turning of the ferrule, and recompression.

With some of the larger sizes of conventional ferrules multiple compressions may be required before a satisfactory encapsulation is achieved. It is also often necessary to perform the operation in two stages by changing the size of the swage blocks between compressions.

It can therefore be seen that the above process is very time consuming as it is extremely labour intensive. There is also substantial extra wear and tear of the press.

The above difficulties arise because of the fact that the material of the ferrule is pushed outwards, between the two swage blocks 2, 3 causing ovality.

As a consequence of the need to carry out several different stages of pressing, the material of the ferrule 1 tends to work harden and become brittle. Furthermore, if short cuts are taken by the press operator, and swaging is attempted in fewer steps than are actually required then the edges of the swage block cavities will tend to dig into the ferrule and cause the formation of flash. At the points on the ferrule on which this flash is formed, the ferrule will be weaker. In order to reduce the chances of flash formation, the edges of the cavities formed in the swage blocks are rounded off. However, this rounding off is only a partial solution to the problem.

There is therefore a long felt need in the industry for a quick and convenient means of encapsulating ropes in a quick and efficient flash-free manner.

According to a first aspect of the invention, there is provided swaging apparatus comprising a swage block, the swage block having an elongate cavity defined therein, the cavity having at least first and second adjoining regions, the first region having a substantially arcuate transverse cross-section and the second region having a non-arcuate transverse cross-section.

Preferably, the cross-section of the second region is substantially constant throughout.

Preferably, the cross-section of the first region tapers from a substantially semi-circular cross-section of a first radius down to a substantially semi-circular cross-section of a second radius, smaller than the first radius.

Preferably, at the point in the cavity in which the first region meets the second region, the transition between the substantially arcuate transverse cross section and the non-arcuate transverse cross-section is a smooth transition.

Preferably, the smooth transition between the first and second regions is achieved by a spark erosion process.

Preferably, the cavity is an indentation formed in an otherwise flat uppermost surface of the swage block.

Preferably, the uppermost portions of the tapered first region are chamfered longitudinally.

Preferably, the transverse cross-section of the second region has the appearance of a half polygon, such that if the upper most surfaces of two identical swage blocks were brought together, the cooperation of the transverse cross-sections of the respective second regions would give the appearance of a completed polygonal figure.

Preferably, the completed polygonal figure so formed is a hexagon.

According to a second aspect of the invention, the swaging apparatus comprises a pair of co-operable swage blocks according to the first aspect of the invention.

The pair of swage blocks may be arranged in a swaging press so that the cavity defined within a first of the swage blocks faces towards the cavity defined within the second of the swage blocks, and the blocks are aligned such that the first region of the first swage block opposes the first region of the second swage block, and the second region of the first swage block opposes the second region of the second swage block.

The swaging press and blocks are arranged so as to enable the performance of a swaging operation by swaging a ferrule onto a rope. Preferably, the swaging operation has the effect of encapsulating a termination region of a flemish eye splice within the ferrule.

According to a third aspect of the invention, a ferrule is provided comprising a hollow elongate body having first and second open ends, the interior of the body forming a passageway for the reception of a rope, or similar, wherein:

the ferrule has first and second body regions, the first body region having a cylindrical inner wall and an outer wall having the appearance of a cylinder onto which flats have been formed.

Preferably, the second body region comprises a tapering nose portion having inner and outer walls which are substantially circular in cross-section and non-parallel.

Preferably, the ferrule is formed in a multi-stage process comprising:

uniformly extruding a tube of material to the desired dimensions of the first body region; and machining part of the exterior wall at one end of the tube so as to taper the tube and thereby form the second body region.

Preferably, the multi-stage process comprises the extra step of pressing the ferrule end to end so that at least part of the second body region is pushed inwardly so as to further taper the nose portion.

As an alternative to extruding the tube of material so as to achieve the desired dimensions of the first body region, the first body region may instead be formed by machining flats onto a cylindrical tube.

In a further alternative, the ferrule may be produced by forging.

According to a fourth aspect of the invention, a method of swaging a ferrule onto a rope is provided, the method comprising:

placing the ferrule onto a desired position on the rope;

placing the ferrule and rope into a swaging press, between a pair of aligned swage blocks; and compressing the ferrule onto the rope by bringing the swage blocks towards one another, wherein the ferrule and swage blocks are shaped such that during compression of the ferrule the swage blocks press the material of the ferrule inwardly towards the rope.

As the material of the ferrule is pressed inwardly, and ovality is avoided, swaging can be effected by a single stroke of the press.

Preferably, the ferrule is a ferrule according to the third aspect of the invention, and the swage blocks are swage blocks according to the first and second aspects of the invention.

According to a fifth aspect of the invention, a method of swaging a ferrule onto a rope or like elongate member is provided, the method comprising:

providing a ferrule having an outer surface comprising flat portions alternating with curved portions;

placing the ferrule onto a desired position on the rope; and compressing the ferrule using apparatus which acts on the flat portions to deform the ferrule such that the size of the flat portions increases to produce a final shape for the ferrule which is substantially polygonal.

The invention also includes swaged ferrules and ropes etc. incorporating the swaged ferrules as well as swaging presses incorporating the swage blocks.

By way of example, an embodiment of the swaging apparatus of the present invention will now be described, with reference to the accompanying diagrammatic drawings, in which:

FIG. 3 shows the unswaged ferrule of FIGS. 2A and 2B in position on a flemish eye spliced wire rope;

Figure 1A:
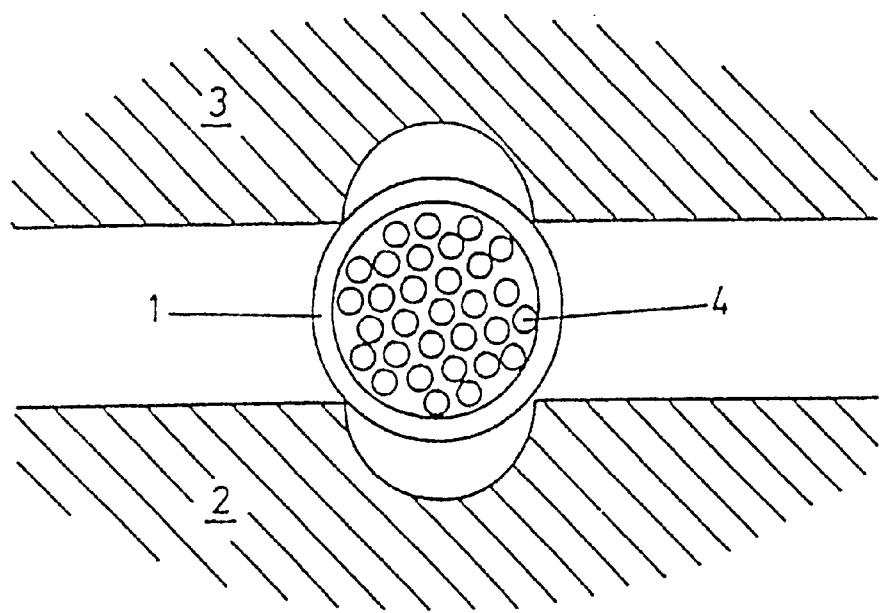
Figure 1B:
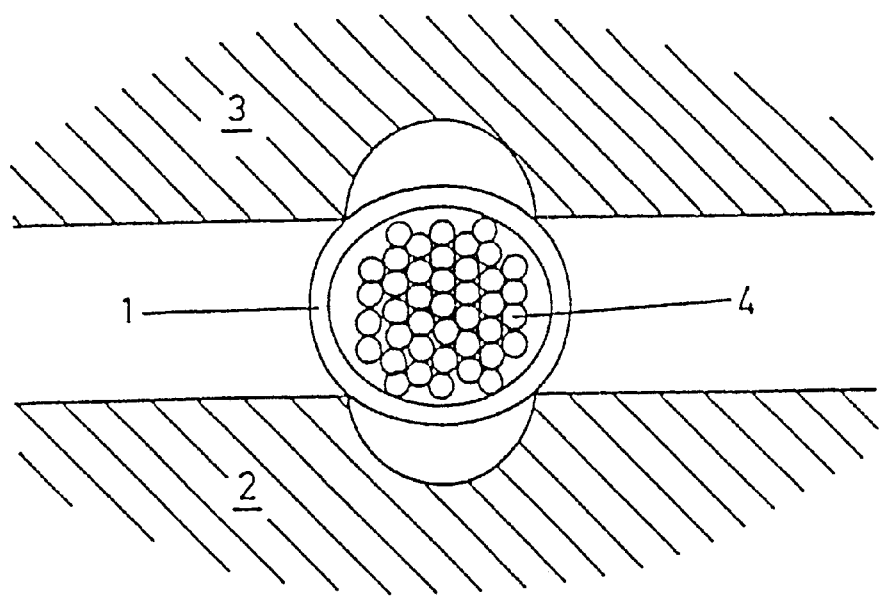
Figure 2B:
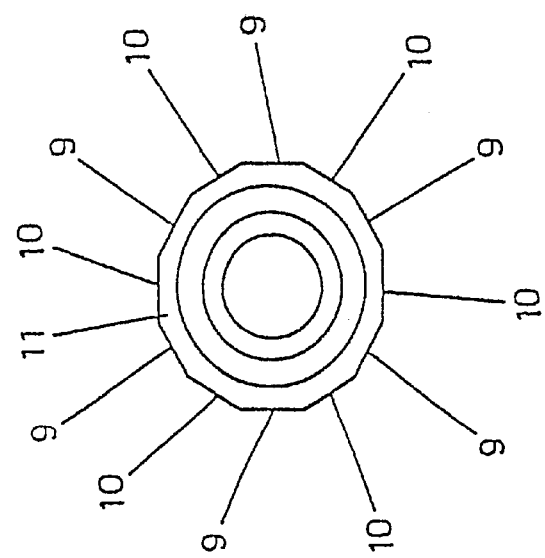
FIG. 2B is an end view of the ferrule of FIG. 2A as viewed from line AA'.
Figure 2A:
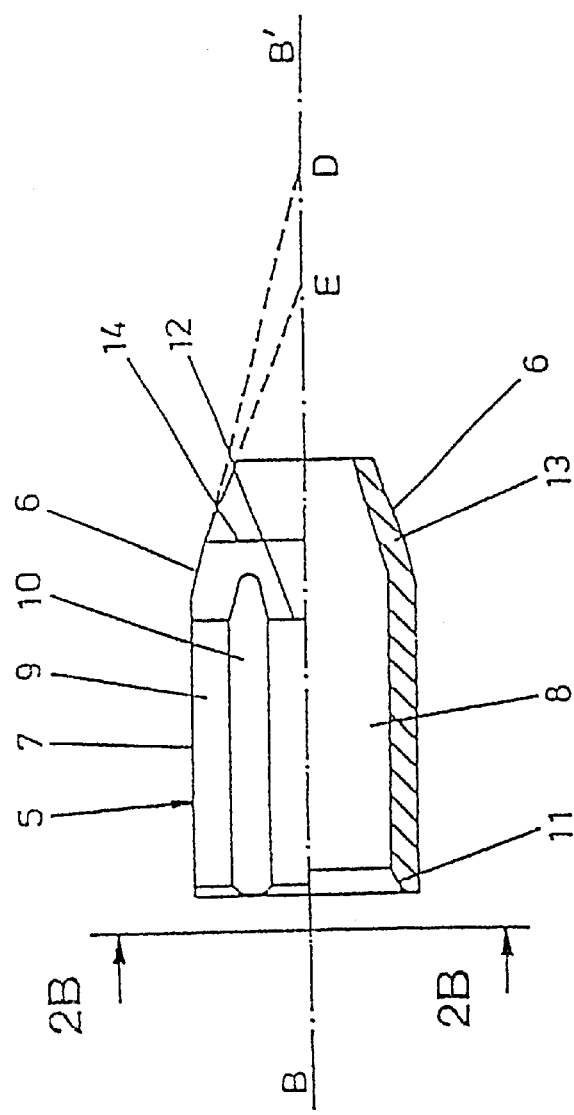
FIG. 2A is a part cross-sectional view showing an embodiment of a ferrule according to the third aspect of the invention.

FIGS. 2A and 2B show a ferrule 5 according to the third aspect of the invention. The ferrule 5 comprises an open ended hollow elongate block of material. The ferrule 5 has a tapered preferably non-parallel nose 6 and a body portion 7.

In FIG. 2A the portion below line BB' is shown in section. From this sectional view and from FIG. 2B it can be seen that the interior wall 8 of the body section 7 is cylindrical, whereas the exterior wall of the body section 7 features both rounded portions 9 and flats 10.

At the body section end of the ferrule, it can be seen that there is formed an interior lip 11 which is slightly bevelled, or chamfered. This chamfering eases the introduction of a spliced wire rope into the ferrule 5.

In order to form a ferrule 5, the following manufacturing steps are carried out. Firstly, a tube of material is extruded, the cross-sectional dimensions of the extruded tube being the same as those of the desired body portion 7. The tube of material would then be cut into appropriate lengths for the formation of independent ferrules and then one end of each of these pieces of material would be machined on a lathe or similar. This machining produces a gently tapering nose, the degree of taper of which is illustrated by the line which finishes at point D on line BB'. As a more steeply tapering nose is generally desired, and machining the nose 6 to the extent required would reduce the thickness of the side wall 13 of the nose 6 to an unacceptable degree, a further manufacturing step is carried out in which the ferrule 5 is pressed end to end so the material at the nose end of the ferrule 5 is pushed inwardly. This pressing produces a second degree of tapering which is illustrated by the line which meets with line BB' at point E. There is therefore provided a tapering nose whose degree of taper changes at a point 14 on the nose 6. During manufacture of the ferrule 5 the lip 11 is also formed.

FIG. 3 shows a ferrule 5 which has been positioned over the spliced ends of a wire rope 4. Prior to placing the ferrule over the spliced ends, the wire rope 4 would have been hand spliced so as to form a flemish eye 15. The ferrule 5 of FIG. 3 is shown in its un-swaged condition.

Figure 5:
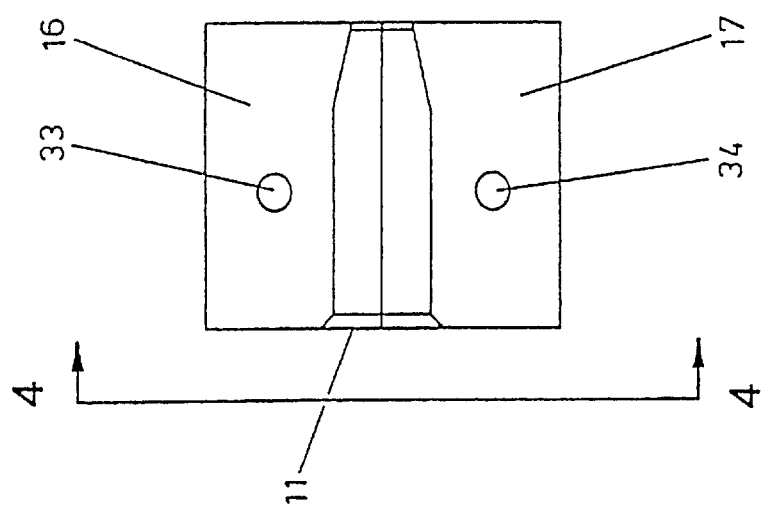
FIG. 5 is a part-sectional side view of the swage blocks of FIG. 4.
Figure 4:
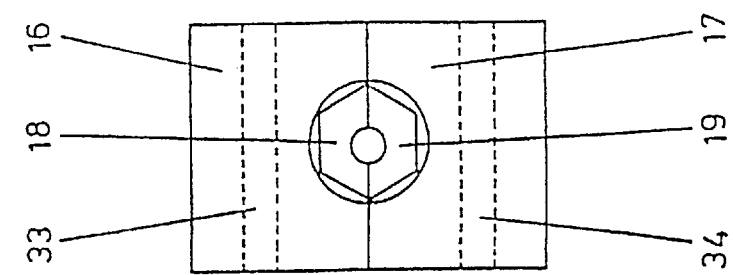
FIG. 4 is an end view of a pair of swage blocks.

Referring now to FIGS. 4 and 5, a pair of swage blocks 16, 17 are shown.

When placed together and viewed from line FF' of FIG. 5 the cooperation of die cavities 18, 19 of the swage blocks 16, 17 gives an overall cavity the shape of which is hexagonal.

The blocks 16, 17 have bores 33, 34 running through them for mounting the blocks to a swaging press (not shown). Although the means for mounting the blocks to a press are shown as through bores 33, 34 it should be realised that any other appropriate mounting means could be provided such as notches or grooves in accordance with the requirements of the swaging press utilised.

Figure 6:
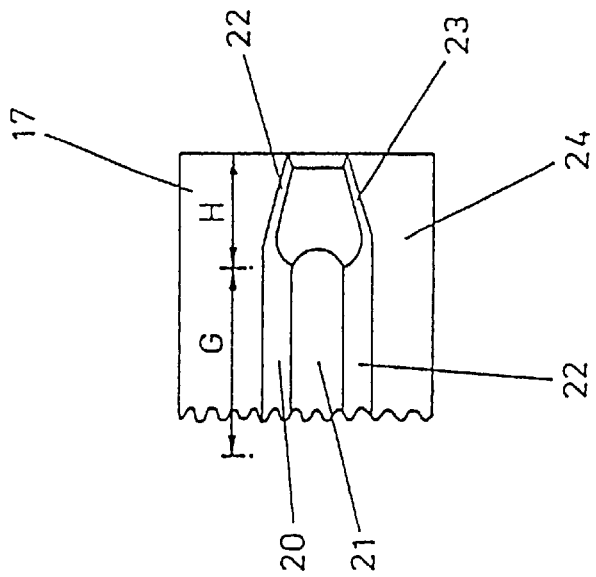
FIG. 6 shows one of the swage blocks of FIGS. 4 and 5 as viewed from above.

As can best be seen from FIG. 6, which is a plan view of part of the swage block 17, the die cavity 19 is basically comprised of a first elongate portion G, for the reception of the body portion 7 of the ferrule 5, and a second tapering portion H for the reception of the nose 6 of the ferrule 5.

The elongate portion G has three side walls 20, 21, 22 which together make up the bottom half of the hexagon shape mentioned above. The portion H is arcuate in cross-section and is in fact generally semi-circular. However, the uppermost parts 22, 23 are relieved slightly so as to provide a slightly wider mouth region adjacent to the top surface 24 of the swage block 17.

At the transition points at which side walls 20, 21 and 21, 22 meet, the die cavity is smoothed so that sharp edges are avoided. Such smoothing helps to reduce or avoid flash formation during a swaging operation.

A further point to note from FIG. 6 is that as the portion G, which has three side walls 20, 21, 22 merges with the portion H, which is semi-circular in cross-section a degree of smoothing is also required so as to achieve a gradual transition. Such a gradual transition is essential, as any abrupt transmissions within the die cavity could lead to the formation of flash. It has been found that by using the process of spark erosion, such gradual transition may be achieved.

Swaging of a ferrule 5 onto a wire rope 14 will now be described with reference to FIGS. 7 and 8.

Figure 7:
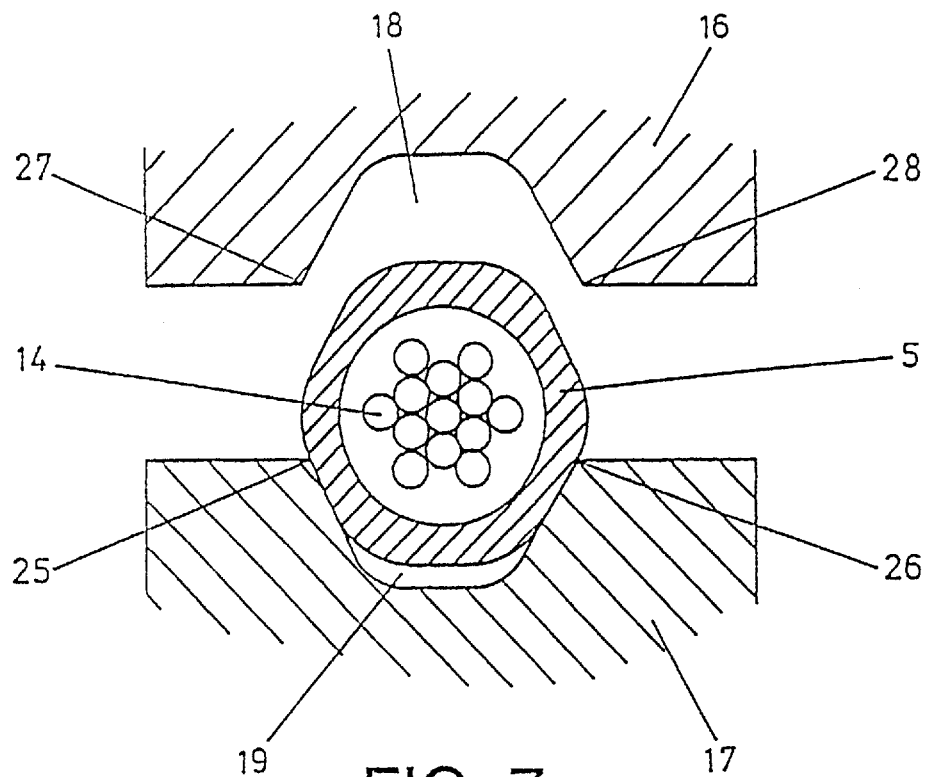
FIG. 7 is a cross-section end view of a pair of swage blocks having a ferrule and spliced rope placed therebetween.

A wire rope 4 having a ferrule 5 positioned on it as shown in FIG. 3 is inserted into the jaws of a swaging press, in which swage blocks 16 and 17 are mounted, as shown in FIG. 7.

The swage block 16 is then brought down into contact with the ferrule 5 and pressing commences.

Figure 8:
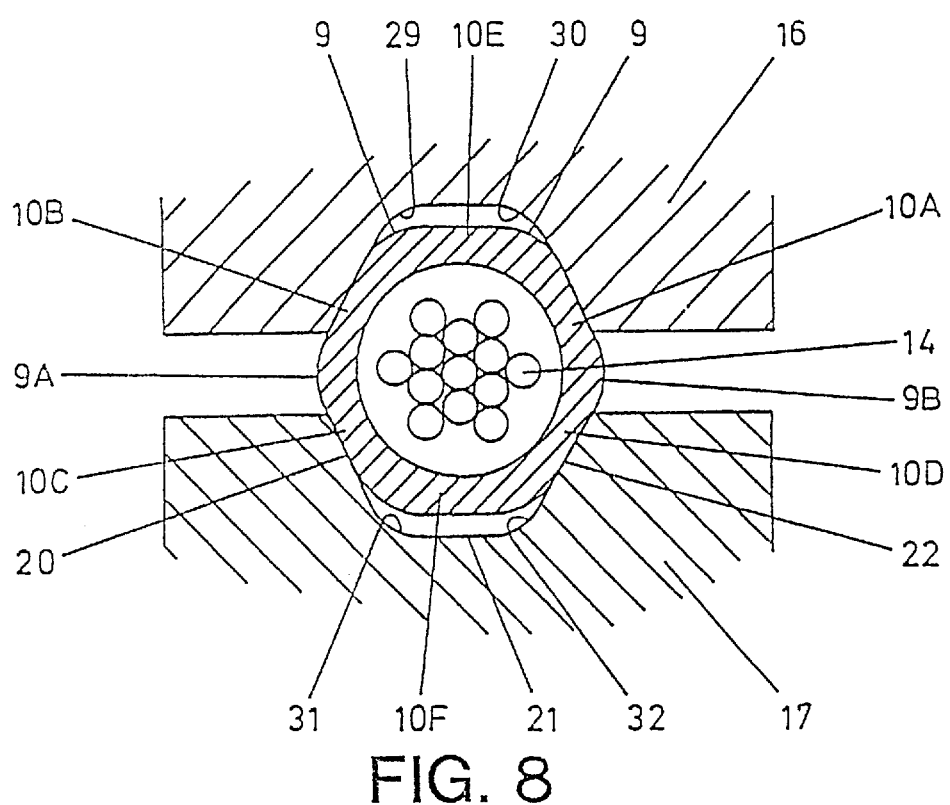
FIG. 8 shows the swage blocks; ferrule and wire rope of FIG. 7, during an early stage in a swaging operation.

FIG. 8 shows an early stage in the swaging operation. As the swage block 16 moves towards the block 17, the ferrule 5 begins to deform and start to fill the die cavities 18, 19. Instead of the material of the ferrule 5 being pushed outwardly, as occurs with conventional swaging operations, the special shapes of the ferrule and the swage blocks ensure that the material actually moves inwardly. During the initial swaging, the middle flats only, designated as 10A, 10B, 10C and 10D on FIG. 8 are in contact with the swage blocks 16, 17. As the swage blocks close, the ferrule 5 is driven further into the blocks and there is a rapid build up of load in the press, as the ferrule walls are now forced into the corners of the swage blocks 16, 17. At this point, with conventional ferrules and swage blocks, the section of the wall between the swages would normally start to fold outwards to form a flash and ovality. However, due to the particular shape of the ferrule and swage blocks being used with the present invention, the rounded portions 9A and 9B instead tend to slide over the corners 25, 26, 27 and 28 of the swage blocks 16, 17 and the material actually moves into the swage blocks rather than out of them. In this manner, the swage blocks 16, 17 can be brought fully home in a simple operation until the top and bottom flats 10E, 10F of the ferrule 5 are in contact with the top and bottom flats of the swage blocks 16, 17.

The corners 29, 30, 31 and 32 of the swage blocks are rounded off as described previously. The rounding off of these corners ensures that there are no sharp edges on the pressed ferrule.

Figure 9:
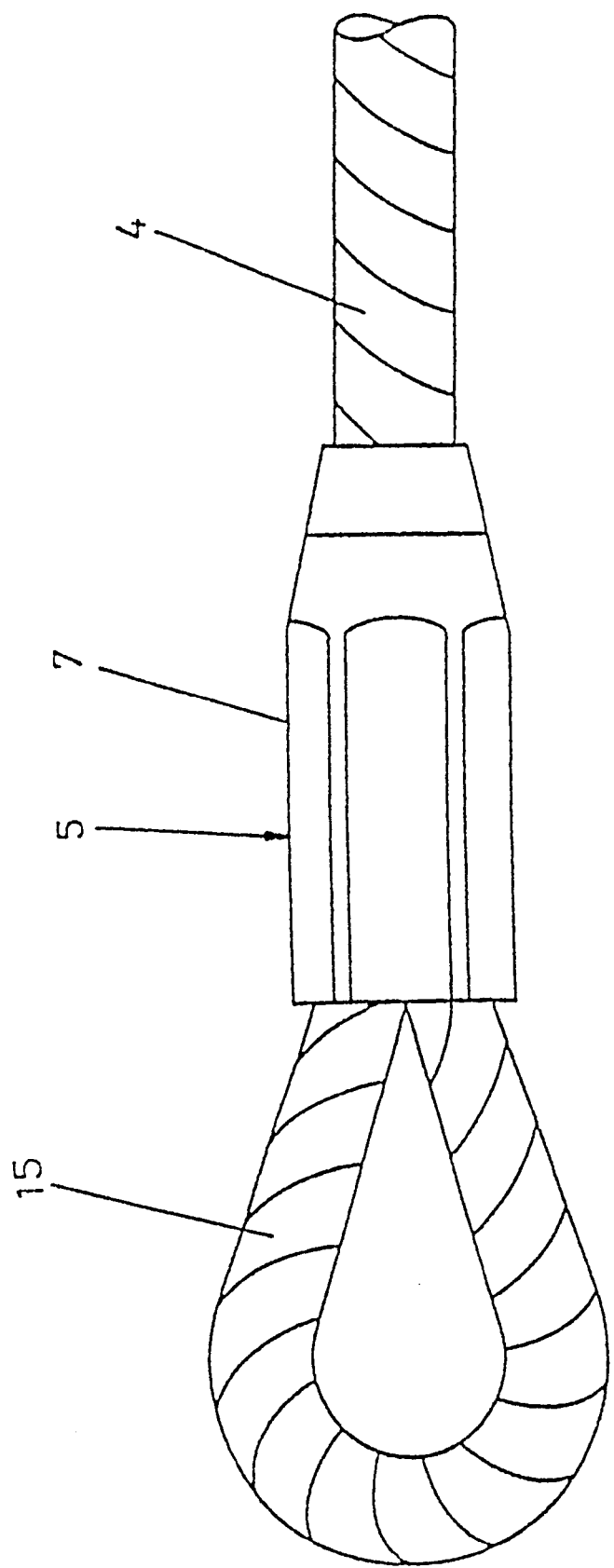
FIG. 9 is a similar view to that of FIG. 3, but shows the ferrule swaged onto the spliced wire rope.

FIG. 9 shows the ferrule 5 and wire rope 4 after the ferrule has been swaged over the spliced ends of the rope. As can be seen, by comparing FIG. 9 with FIG. 3, the ferrule is now generally hexagonal in cross-section with slightly rounded corners, as it now conforms generally to the dimensions of the die cavities 18, 19. The ferrule is now longer, as during the process of compression onto the rope 4 the ferrule 5 tends to elongate. The ferrule 5, in its swaged condition, takes on the appearance of a sharpened hexagon pencil. Because the ferrule has basically flat sides, it is very easy for identification marks to be made on the ferrule. It is often desired to make such identification marks, to show the manufacturer's details, strength characteristics etc. With conventional round-pressed ferrules, marking is very difficult.

Conventional ferrules tend to lengthen much more during the swaging operation, and this can lead to undesirably thin side walls. As the ferrule according to the present invention does not tend to lengthen as much as conventional ferrules, the side wall of the body portion 7 will not be reduce in thickness in the same manner or to the same degree as that of conventional ferrules.

Ferrules in accordance with the present invention may be made from a steel, aluminium, brass, stainless steel or any other suitable material.

Although the embodiment described concerns the encapsulation of spliced joints in wire ropes, it should also be understood that the swaging apparatus of the present invention may be used in other applications and for the encapsulation of other types of ropes, for example, synthetic ropes.

From the above description, it can be seen that the method and apparatus of swaging as provided by the present invention, provides significant advantage over the conventional methods.

In particular, swaging down of the ferrule is achieved in a single flash-free compression, whereas to swage down conventional ferrules many compressions are necessary.

Only one set of swage blocks are used for a single size of ferrule with the apparatus of the present invention. For conventional ferrules and swaging apparatus, a change in swage blocks is often necessary half way through the swaging process.

Due to the single stage operation, there is a significant simplification in handling in what is usually a very labour intensive operation.

With the present invention there is less wear and tear on swaging presses.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A ferrule comprising a hollow elongate body having first and second open ends, the interior of the body forming a passageway for the reception of a rope, or similar, wherein:
   the ferrule has first and second body regions, the first body region having a cylindrical inner wall defining a circular inner cross-section and an outer wall having the appearance of a cylinder onto which flats have been formed to provide the outer wall with a transverse cross-section consisting of flats interlinked by radiussed portions and wherein the second body region comprises a tapering nose portion having inner and outer walls which are substantially circular in cross-section.

2. A ferrule according to claim 1, wherein the second body region has inner and outer walls which are non-parallel.

3. A method of swaging a ferrule, comprising a hollow elongate body having first and second open ends, the interior of the body forming a passageway for the reception of a rope, or similar, wherein:

the ferrule has first and second body regions, the first body region having a cylindrical inner wall defining a circular inner cross-section and an outer wall having the appearance of a cylinder onto which flats have been formed to provide the outer wall with a transverse cross-section consisting of flats interlinked by radiussed portions and wherein the second body region comprises a tapering nose portion having inner and outer walls which are substantially circular in cross-section, onto a rope or like elongate member, the method comprising:

(a) placing the ferrule onto a desired position on the rope, (b) placing the ferrule and rope into a swaging press, between a pair of aligned co-operable first and second swage blocks, the blocks being arranged in a swaging press so that a cavity defined within the first swage block faces towards a cavity defined within the second swage block and the blocks being aligned such that a first region of the first swage block opposes a first region of the second swage block and a second region of the first swage block opposes a second region of the second swage block, and (c) compressing the ferrule onto the rope by bringing the swage blocks towards one another in a single flash-free compression.

4. A method according to claim 3, wherein during compression the swage blocks act on the flats to deform the ferrule such that the size of the flats increases relative to that of the radiussed portions on the outer wall transverse cross-section.

* * * * *